United States Patent
Yu et al.

(10) Patent No.: US 11,171,912 B2
(45) Date of Patent: Nov. 9, 2021

(54) MULTI-DEVICE WORKSPACE NOTIFICATIONS

(71) Applicant: Citrix Systems, Inc., Fort Lauderdale, FL (US)

(72) Inventors: Yedong Yu, Nanjing (CN); Xiaolu Chu, Nanjing (CN); Yajun Yao, Nanjing (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 219 days.

(21) Appl. No.: 16/423,609

(22) Filed: May 28, 2019

(65) Prior Publication Data

US 2020/0304454 A1 Sep. 24, 2020

Related U.S. Application Data

(63) Continuation of application No. PCT/CN2019/078949, filed on Mar. 21, 2019.

(51) Int. Cl.
*H04L 12/58* (2006.01)
*H04L 29/06* (2006.01)

(52) U.S. Cl.
CPC ............ *H04L 51/36* (2013.01); *H04L 51/046* (2013.01); *H04L 51/14* (2013.01); *H04L 51/24* (2013.01); *H04L 63/08* (2013.01); *H04L 63/101* (2013.01)

(58) Field of Classification Search
None
See application file for complete search history.

(56) References Cited

U.S. PATENT DOCUMENTS

| 6,363,411 B1* | 3/2002 | Dugan | H04M 3/42136 379/201.01 |
| 7,406,699 B2* | 7/2008 | Liu | G06F 9/547 719/328 |
| 7,849,502 B1* | 12/2010 | Bloch | H04L 63/168 726/11 |

(Continued)

FOREIGN PATENT DOCUMENTS

| CN | 101516096 A | 8/2009 |
| CN | 101909019 A | 12/2010 |

(Continued)

OTHER PUBLICATIONS

Nov. 4, 2019—(WO) International Search Report and Written Opinion—App PCT/CN2019/078949.

(Continued)

*Primary Examiner* — Davoud A Zand
(74) *Attorney, Agent, or Firm* — Banner & Witcoff, Ltd.

(57) ABSTRACT

Methods and systems for a centralized notification service are described herein. The centralized notification service may store notification data received from a plurality of devices and workspaces in a notification database. The notification database may store user account information, associated device and workspace information, associated application information, and notifications received or retrieved from each device and application associated with a user account. The notification service may receive notification data from a plurality of applications based on hooks injected into applications or into a notification manager service.

20 Claims, 9 Drawing Sheets

(56) References Cited

U.S. PATENT DOCUMENTS

| | | | |
|---|---|---|---|
| 8,739,249 B1* | 5/2014 | Kay | H04L 63/08 |
| | | | 726/3 |
| 2005/0176449 A1 | 8/2005 | Gui et al. | |
| 2005/0222815 A1* | 10/2005 | Tolly | H04L 43/50 |
| | | | 702/185 |
| 2008/0120129 A1* | 5/2008 | Seubert | G06Q 10/10 |
| | | | 705/35 |
| 2009/0309742 A1* | 12/2009 | Alexander | G08B 27/006 |
| | | | 340/601 |
| 2011/0161436 A1* | 6/2011 | Moore | H04L 51/066 |
| | | | 709/206 |
| 2011/0239306 A1* | 9/2011 | Avni | G06F 21/554 |
| | | | 726/26 |
| 2018/0205715 A1* | 7/2018 | Ingale | H04L 67/26 |

FOREIGN PATENT DOCUMENTS

| | | | |
|---|---|---|---|
| CN | 102075450 A | 5/2011 | |
| CN | 103685137 A | 3/2014 | |
| CN | 103957150 A | 7/2014 | |
| CN | 108965105 A | 12/2018 | |

OTHER PUBLICATIONS

Ivo Ivanov et al. "Unveiling of API Hook Programmer" Jul. 15, 2006, No. 7 pp. 95-97.
Shi Lei et al. "Hook Function's Application on Digital Blackbox System Micro-computer Information" Jul. 30, 2006, No. 21 pp. 251-253.

\* cited by examiner

MULTI-DEVICE WORKSPACE NOTIFICATIONS

CROSS-REFERENCE TO RELATED APPLICATIONS

The present application claims priority to International Application No. PCT/CN2019/078949, filed Mar. 21, 2019, and entitled "Multi-Device Workspace Notifications," which is hereby incorporated by reference as to its entirety.

FIELD

Aspects described herein generally relate to providing notifications to users in computing environments. More particularly, the invention relates to methods and systems for providing notifications from multiple client devices and/or applications in a single host environment.

BACKGROUND

Increasingly, employees use multiple devices and switch between multiple devices throughout the day. Usually, users focus their workspace attention on one device at a time. As such, a user may not be aware of device specific information that is pushed to a single device when the user is not working on or checking that device. For example, if a user forgets a device at home or is focused on a single task for a long period of time, notifications sent to a single device may be missed for a long period of time. On the other hand, if users are frequently switching between applications or devices they may lose efficiency or become distracted.

According to other research, companies are proliferating applications at an astonishing rate. Many employees may have five or more applications open simultaneously. The average large company uses more than 500 applications, and the average employee uses at least nine applications. Intelligent workspaces may associate notifications with tasks via micro-applications that enhance productivity thru short-cuts. Task switching, as well as device switching, may lower an end user's productivity.

The configuration of many applications and micro-applications, and the aggregation of each application's notifications into a single workspace, may require substantial resources, and maintaining those applications requires additional resources. In addition, users may find notification messages in their workspace to be distracting and overwhelming. However, users may also be distracted or interrupted by notifications on personal devices outside of their workspace.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed towards providing notifications to users in computing environments. Based on the invention, end users may view and receive personalized notifications that may be pushed to multiple devices, to avoid missing any key messages and increase productivity. By implementing application hooks and a centralized notification system, notifications displayed or pushed to any devices can be redirected to a centralized notification service in order to help users avoid missing important notifications, as well as to keep user focus on a single device workspace. A user friendly intelligent workspace may offer a customizable notification area, in which end users may bring their own notifications into their workspace. Such a workspace may allow user focus to be maintained on a current workspace while being informed of notifications related to applications (e.g. SMS and WhatsApp messages and policy enforcement), devices (e.g. device status and updates), events (e.g. weather and emergency alerts). Notifications from different applications or vendors may be provided on various devices. The notifications may be aggregated in a centralized notification system to be provided to a user.

The methods may include receiving, by a computing system and from a notification redirection service on a first remote device, at least one notification associated with a user, storing, by the computing system and in a notification database, the at least one notification associated with the user and from the first remote device in a notification database, wherein the at least one notification is stored in a portion of the notification database associated with the user, determining, by the computing system, an authenticated user workspace of a second remote device associated with the user, transmitting, by the computing system and to the authenticated user workspace of the second remote device, the at least one notification associated with the user and from the first remote device stored in the notification database. The methods may include transmitting, by the computing system and to the first remote device, the notification redirection service configured to obtain notification data from at least one application, and causing, by the computing system and in the first remote device, installation of the notification redirection service. The methods may include receiving, by the computing system and from the first remote device, an indication of a user login event, transmitting, by the computing system and to the notification redirection service on the first remote device, an application whitelist associated with the first remote device, causing, by the computing system, transmission of at least one notification from the notification redirection service of the first remote device based on the application whitelist, transmitting, by the computing system and to the first remote device, an application whitelist associated with the user, causing, by the computing system and in the first remote device, installation of a notification hook in at least one application indicated by the application whitelist, receiving, by the computing system, at least one notification generated by the at least one application, receiving, by the computing system and from a workspace associated with the user, an indication of a user login event, transmitting, by the computing system and to the workspace, an application whitelist associated with the first remote device, causing, by the computing system, transmission of at least one notification from the first remote device based on the application whitelist, receiving, by the computing system and from a workspace associated with the user, credential information for a user login event, matching, by the computing system and to the workspace, the credential information with user account information stored in the notification database, and transmitting, by the computing system and to the workspace associated with the user, at least one notification stored in the notification database and associated with user account information matching the credential information. The credential information for the user login event is used to authenticate the user to a plurality of cloud computing services.

In some examples, the methods may include determining, by the computing system, a plurality of devices and workspaces associated the user, requesting, by the computing system and from each of the plurality of devices and workspaces associated the user, notification data, storing, by the computing system and in the notification database, notification data received in response to the requesting, transmitting, by the computing system and to the authenticated user workspace, the stored notification data, and receiving, by the computing system and from the authenticated user workspace, notification data generated by the authenticated user workspace. At least one notification associated with the user, may be transmitted by the computing system to a notification feed application of the second remote device.

The methods may include receiving, by a computing device and from a centralized notification service, an application whitelist associated with a user account, providing, by the computing device, at least one application hook for retrieving notification data from at least one application of the computing device, aggregating, by a notification redirection service of the computing device, notification data from the at least one application hook, and transmitting, by the notification redirection service of the computing device, the notification data to the centralized notification service. The application whitelist received from the centralized notification service may be a global application whitelist.

The methods may include generating, by the computing device, a local application whitelist based on applications installed on the computing device, combining the global application whitelist with the local application whitelist, aggregating notification data received from a plurality of applications based on the combining, and transmitting the aggregated notification data to the centralized notification service. In some examples, the methods may include receiving, by the computing device and from the centralized notification service, an application blacklist associated with a user account, preventing, by the notification redirection service of the computing device, notification data of an application of the application blacklist from being transmitted to the centralized notification service, transmitting, by the computing device and to the centralized notification service, authentication data associated with the user account, receiving, from the centralized notification service, the notification redirection service, coupling the notification redirection service with a notification manager of the computing device, and transmitting aggregated notification data from the notification manager to the centralized notification service.

In addition, in some examples, aspects of the disclosure may include a computing device, apparatus, or system including a processor, and memory storing computer executable instructions. The instructions, when executed by the processor, may cause such a computing device to store, in a notification database, user account data of at least one user account and at least one application whitelist associated with the at least one user account and configured to approve at least one application for notification transmittal, to receive, from a remote device, a notification associated with the at least one user account, to store, in a notification database, the notification in the notification database, wherein the notification is associated with the at least one user account and is stored in a portion of the notification database associated with a corresponding user account, to receive an authentication for an authenticated user workspace session, to transmit, to the authenticated user workspace session, at least one notification stored in the notification database and associated with the corresponding user account, to periodically request notification data from a plurality of devices and workspaces associated the user, to transmit, based on the authenticated workspace associated the user, the notification data stored in the notification database, to receive an indication of a user login event for a first user account, to request, based on the indication of the user login event for the first user account, notification data from at least one remote device associated with the first user account, to store the notification data in the notification database, and to transmit the notification data to the authenticated user workspace session.

In addition, the instructions may cause such a computing device to receive an indication of a user login event from a workspace associated with the user, transmit, to the authenticated user workspace session, an application whitelist associated with the remote device, to request transmission of at least one notification from the remote device, to receive, from the authenticated user workspace session, credential information for a user login event, to match the credential information with user account information stored in the notification database, to transmit, to the authenticated user workspace session associated with the user, at least one notification stored in the notification database and associated with the authenticated user workspace session by matching the credential information, to determine a plurality of devices and workspaces associated the user, to request notification data from each of the plurality of devices and workspaces associated the user, to store notification data received in response to the request in the notification database, and to transmit the stored notification data to an authenticated user workspace session.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing a centralized source of notifications, which may originate from a plurality of applications and devices, using a cloud based centralized notification management system. A notification management system may implement a hook system, such that notifications displayed or pushed to any associated applications and devices may be redirected to a centralized notification service in order to help users avoid missing important notifications, as well as to keep a user focused on a single device workspace. As a result, individuals associated with the notification management system may advantageously maintain awareness of notifications from different sources without loosing focus.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
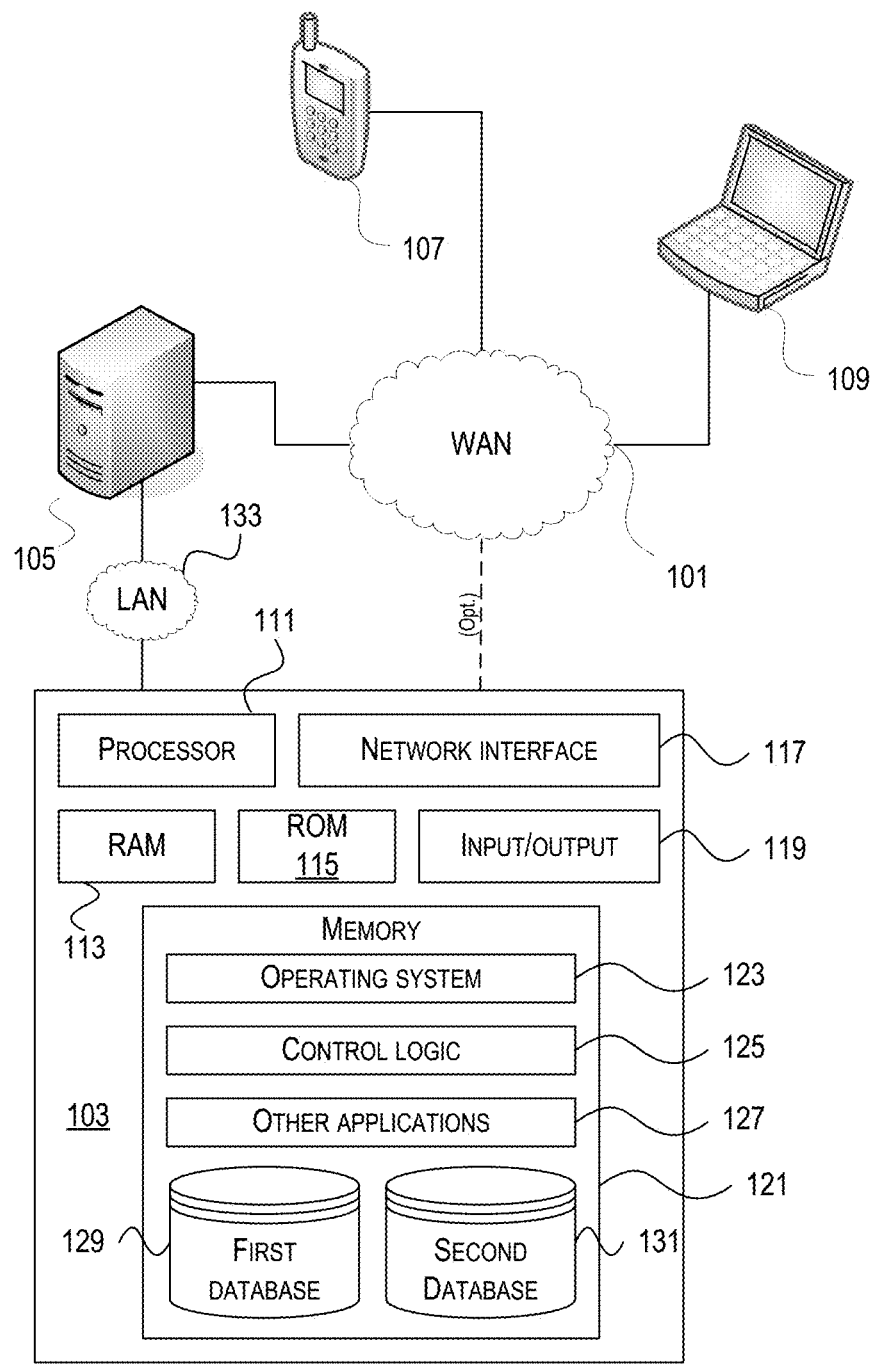
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
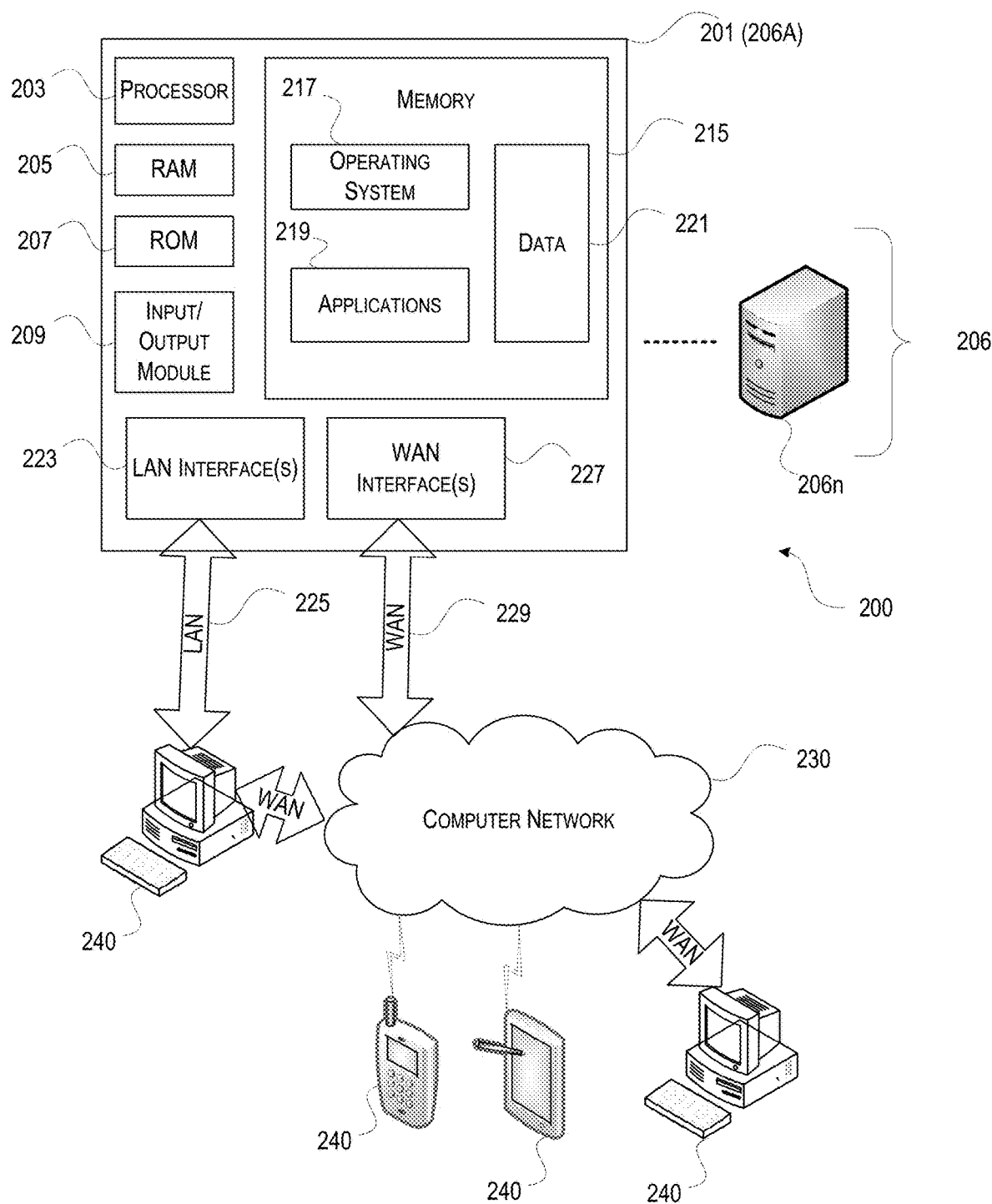
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
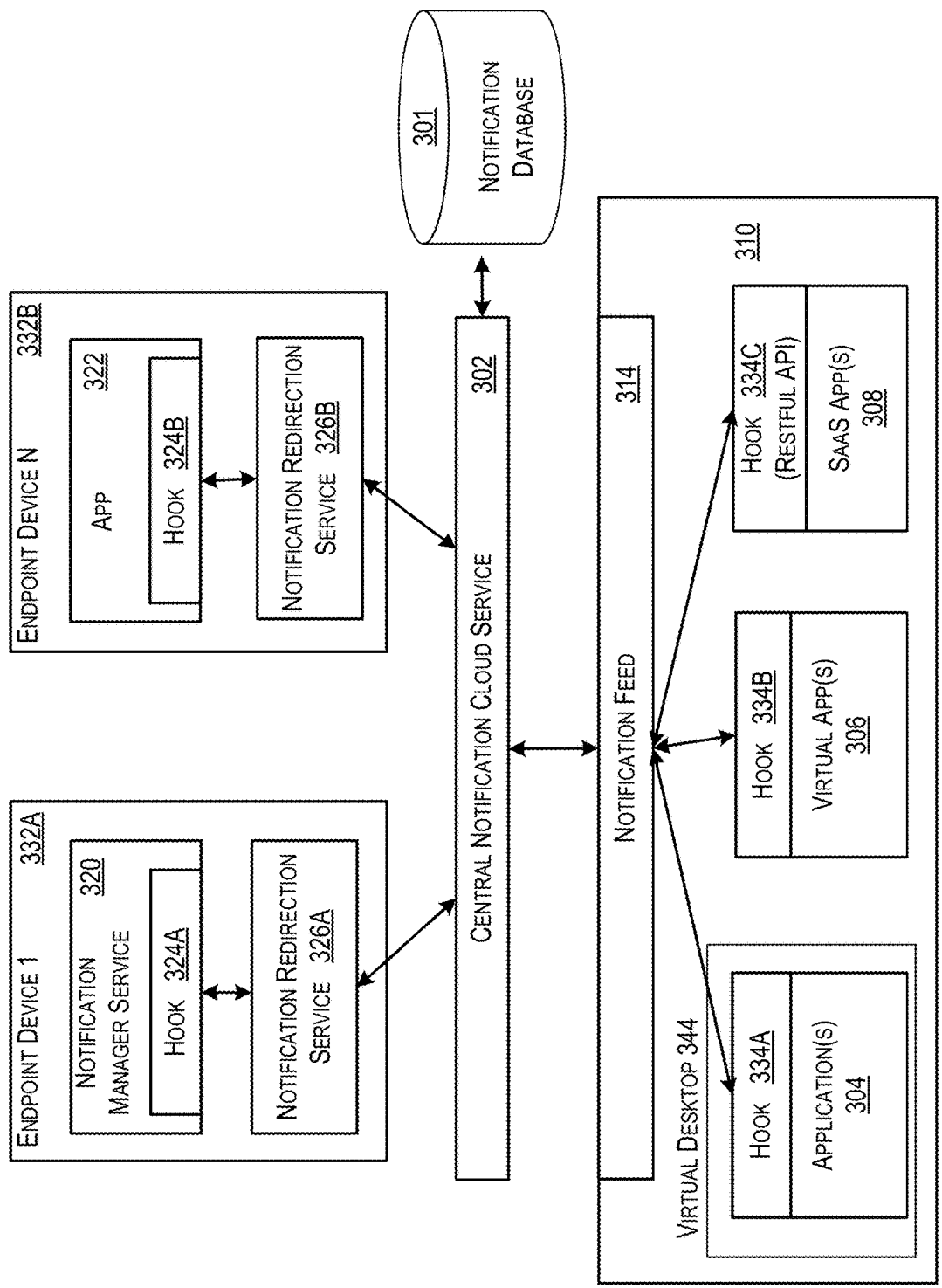
FIG. 3 depicts an illustrative notification system architecture that may be used in accordance with one or more illustrative aspects described herein.

FIG. 3 shows a high-level architecture of an illustrative notification management system. The notification management system may include a central notification service 302, and may manage associations between devices and applications that generate notifications for a particular user. The central notification service 302 may be coupled to a notification database 301. The notification database 301 may be configured to store user account information, associated device and workspace information, associated application information, and notifications received or retrieved from each device and application associated with a user account. The central notification service 302 may be communicably coupled to a plurality of application hooks injected into applications or into a notification manager service to forward notification messages to a notification redirection service and the central notification service.

The central notification service 302 may be a dedicated application or device, may be integrated into other network or cloud services, or may be integrated into a workspace application. Notification messages may be aggregated and redirected from all endpoint devices or workspaces registered with the central notification service 302, and the central notification service 302 may store aggregated notification messages in the notification database 301. The central notification service 302 may register endpoint devices and/or workspaces with the notification service. The central notification service 302 may provide notifications to user workspaces, may be accessed through a web browser, and may display notification messages as a web server. The central notification service 302 may be configured with an application whitelist, which may be periodically updated with indicators of applications and notification types that are to be gathered and are permitted to be transmitted the central notification service 302. The application whitelist may be distributed by the central notification service 302 to a plurality of endpoints and associated workspaces. The central notification service 302 may periodically request notification data from any associated end point user device. The central notification service 302 may be configured to retrieve or transmit notifications associated with an end user account when the user account has an associated authenticated workspace session. The central notification service 302 may be configured to limit or halt data requests and transmissions when no user is logged onto the service.

The notification database 301 may include a plurality of databases of data. User account information may be stored for each user or user workspace account. The user account information may indicate associated groups, such as organizations, workgroups, or teams, associated with the user account. Each group may have a set of associated authorizations, such as whitelists or blacklists, indicating applications, workspaces and devices from which notifications may be requested or transmitted. For example, an executive group, a marketing group, and an outside vendor group may each have different associated notification authorizations. A whitelist, indicating that notifications from approved applications should be transmitted to the associated user account, for a marketing group may include different applications than a whitelist for an engineering group. A blacklist associated with the user account may indicate that notifications from listed applications, workspaces and devices should be prohibited from being transmitted to the associated user account.

The central notification service 302 may register user accounts with different groups, which may allow different notifications to be stored in the database and transmitted to user workspaces. For example, group specific notifications may be stored and generated based on the user account settings. The user may also be prompted to add group specific software that may not be installed. The notification database 301 may store an indication of each application and device associated with a user account, and may store a log of all updates received by the associated applications. The notification database 301 may store a copy of notifications received or retrieved from each device and application associated with a user account, and may update those notifications based on actions taken by a user. For example, the notification database 301 may receive and store an associated status (e.g. read, flagged for follow up, or cleared) with each notification based on a system configuration, and the notifications may be stored for a particular period of time or until acted on based on a configuration by a system administrator or user.

A notification message may be include at least one of an endpoint device ID or workspace ID, an application name, a message payload, and a multimedia message download links. The notification message may include multimedia content or a link or agent to download multimedia content, and the notification database 301 may include a download agent that automatically uploads the multimedia content to the notification database 301. The central notification service 302 and the notification database 301 may store provisioning data, which may include enrollment data for endpoint devices and workspaces, and application whitelists that may be associated with different endpoint devices and workspaces based on the enrollment data.

Endpoint devices 332A and 332B may include a mobile device, a tablet, a personal computer, an Internet of Thing (IoT) thin client, or the like assigned, at least in part, to a user. Each endpoint device may host a notification manager service 320 (e.g. Apple's iOS Notification Center or Microsoft's Action Center). The central notification service 302 may include an application program interface to allow users and administrators to register devices with the central notification service 302. The notification manager service 320 may receive notifications or alerts from a plurality of applications. A hook 324A may be provided to the notification manager service 320 so that new notification events may be passed to the notification cloud service 302. A hook 324B may also be provided directly to an application 322. The hooks 324A and 324B may be associated with a notification redirection service 326A and 326B. The notification redirection service may gather local device notifications from each associated application and transmit the notifications to central notification service 302. The central notification service 302 may be configured to periodically request and receive notifications from hooks 324A and 324B or notification redirection service 326A and 326B. The notification redirection service 326A and 326B may push notifications to the central notification service 302, and may either periodically transmit notification data or may transmit notifications as they are received.

The notification redirection service 326A and 326B may register the endpoint devices 332A and 332B or workspaces to the central notification service 302. The registrations may be based on user account information which associates the endpoint devices 324 and the workspace of a notification feed for presenting aggregated notifications to a user. The notification redirection service 326 may process an application whitelist, which may be transmitted to the notification redirection service 326 from the central notification service 302. The notification redirection service 326 may configure a local application whitelist and may combine the local application whitelist with a global whitelist received from the central notification service 302. The local whitelist may include settings and selections made by a user when the notification redirection service 326 is set up on an end user device. The global whitelist may include predefined applications associated with the account information of an end user. For example, the global whitelist may be configured by a system administrator of the end user's employer. The notification redirection service 326 may inject a hook into any applications provided in the combined whitelist, or into the notification redirection service 326 that manages notifications for the device or workspace. Based on such hooks, the notification redirection service 326 may redirect notification messages from hooks to the central notification service 302, such that the notifications are available to be distributed to an active workspace or device.

Notifications stored by the central notification service 302 may be provided to a notification feed 314 that may be provided in a user workspace 310 (e.g. a Citrix cloud or Sapho workspace provided by Citrix Systems, Inc., of Fort Lauderdale, Fla.). The workspace 310 may include a virtualization system that may be single-server or multi-server system, or cloud system, including at least one virtualization server configured to provide virtual desktops and/or virtual applications to one or more client access devices. As used herein, a workspace 310 may include a graphical environment or space in which one or more applications may be hosted and/or executed. A desktop workspace 310 may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Notification feed 314 may aggregate notification events generated in a workspace 310 and from third parties thru at least one application program interface (API). The notification feed 314 may be configured to receive notifications from applications 304, virtual applications 306, and Software as a service (SaaS) applications 308. Each application may have an associated hook 334A-334C. The application 304 may be part of a virtual desktop 344. The workspace 310 may use a hook 334C with a RESTful API based on representational state transfer (REST) technology through a web service. The notification feed may aggregate notification events directly from applications 304-308 operating in the workspace 410, or may receive notification data for those applications from the notification redirection service 326.

Figure 4:
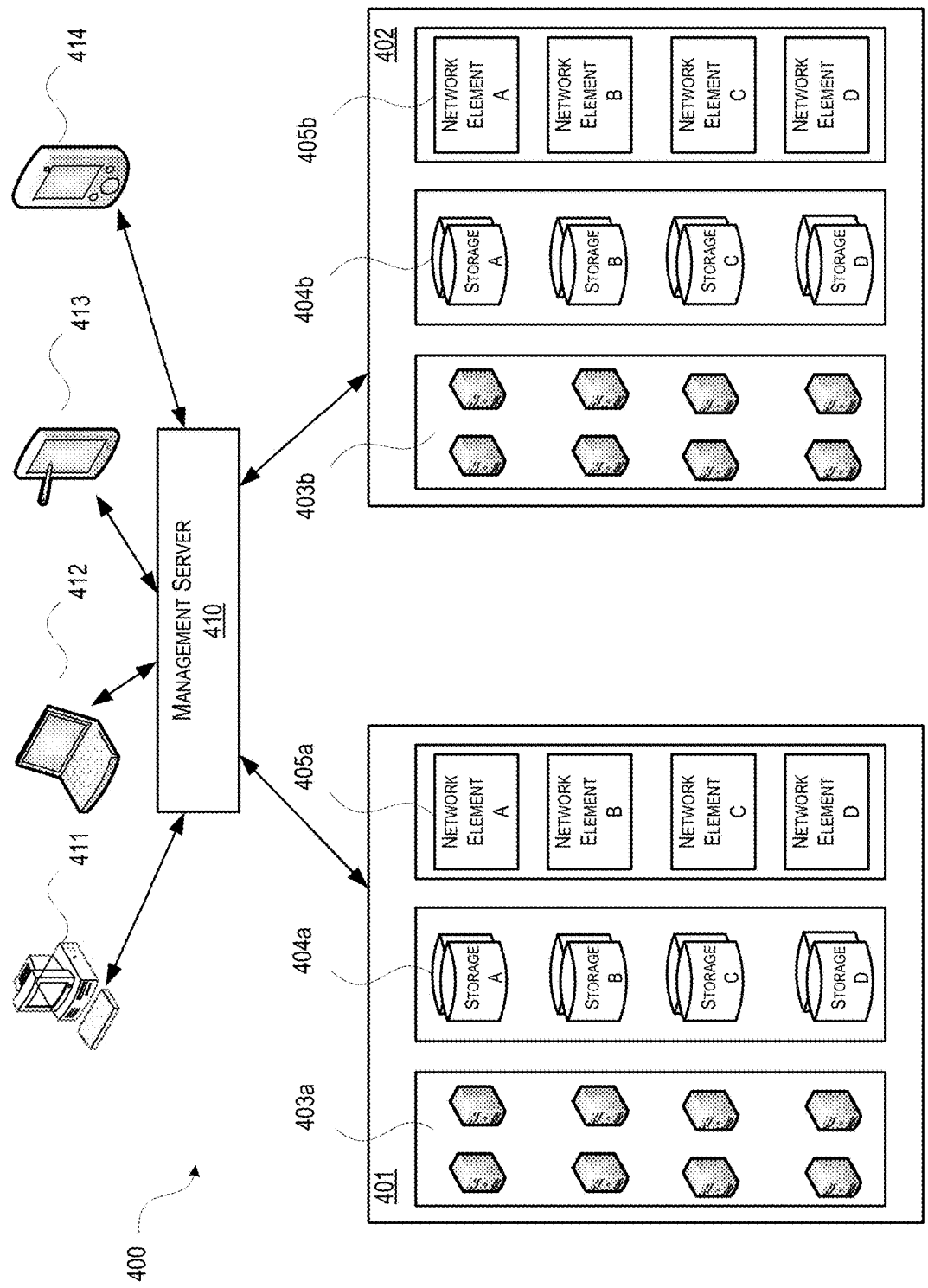
FIG. 4 depicts an illustrative cloud-based system architecture that may be used in accordance with one or more illustrative aspects described herein.

With further reference to FIG. 4, some aspects described herein may be implemented in a cloud-based environment, including the central notification service 302 and notification database 301. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5:
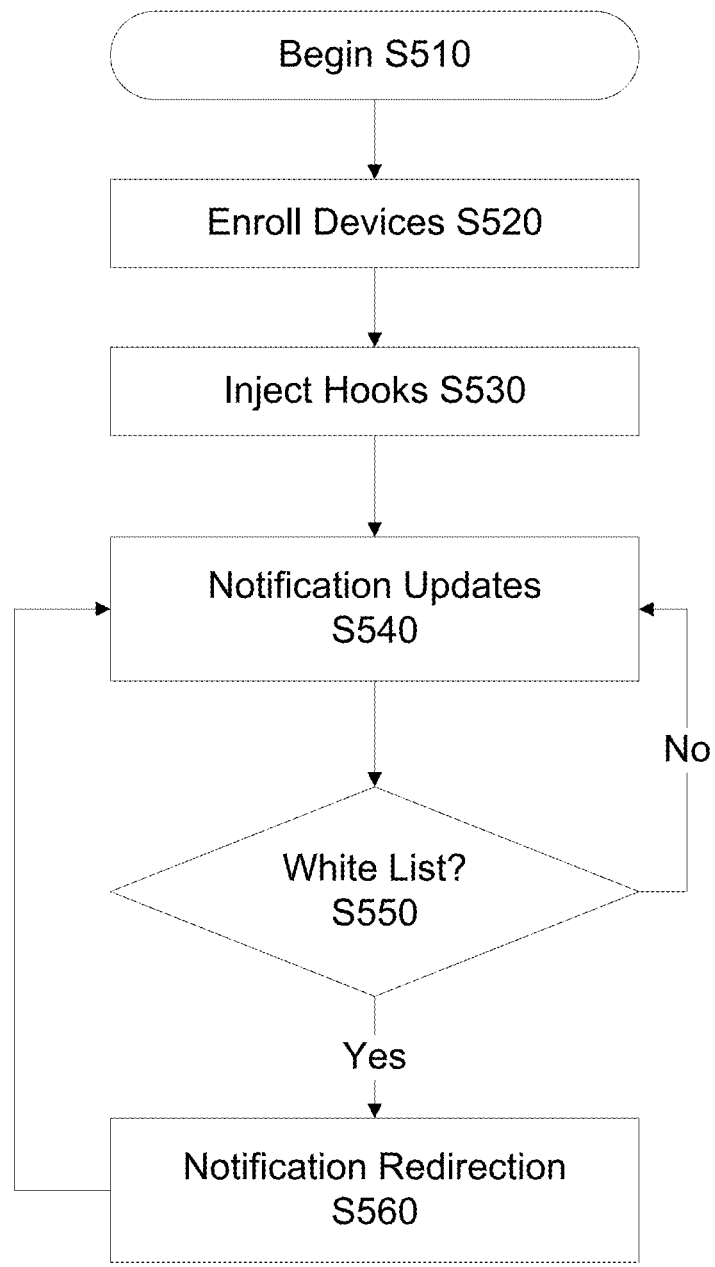
FIG. 5 depicts an illustrative a process workflow for a centralized notification system.

FIG. 5 depicts an illustrative algorithm for hooking notification message service of a device and workspace management system. In step S510, when an endpoint device 332 or workspace 310 is to be added to the central notification service 302, an initiation process may begin with a user account registration and the downloading or activating of appropriate software or device settings. In step S520, endpoint device 332 or workspace 310 may be registered to be associated with a user account, which may have been previously created by a system administrator. The endpoint device 332 or workspace 310 may have identification and communication information stored with the central notification service 302 and in the notification database 301. The device enrollment may be based on a device and application management service (e.g. XenMobile provided by Citrix Systems, Inc., of Fort Lauderdale, Fla.). When an endpoint device 332 or workspace 310 is registered with the central notification service 302, the central notification service 302, notification feed 314, or a notification redirection service 326 may, in step S530, inject at least one hook into a notification message service and may transmit at least one notification whitelist indicating applications for which notifications may be passed to the central notification service 302. An application whitelist may be determined based on groups associated with the user account. A notification redirection service 326 may inject at least one hook 324 into a notification manager service 320 or at least one application 322. The notification hooks may be injected into applications determined based on a received whitelist, which may be a global whitelist, and a local whitelist, which may be based on user notification settings.

In step S540, the notification redirection service 326 (or a notification workspace feed 314) may receive notification messages from any hooked applications, and may aggregate those notifications for transmission to the central notification service 302. Before transmission, in step S550, the notification redirection service 326 may check the source application of any receive notification data against a whitelist. That is, each notification is checked against the whitelist to determine if the notification is a notification for a registered application on a local or global whitelist, and if the associated application is determined to be on a whitelist, in S550, the notification may be transmitted by the notification redirection service 326 to the central notification service 302. If the notification is not associated with an application on the whitelist, the notification redirection service 326 may disregard or dispose of the notification. If the notification is associated with an application on the whitelist, the notification redirection service 326 may transmit the notification of the central notification service 302 for storage in the notification database 301. At the same time, the end user device 332 may be configured to display the notification message locally.

Figure 6:
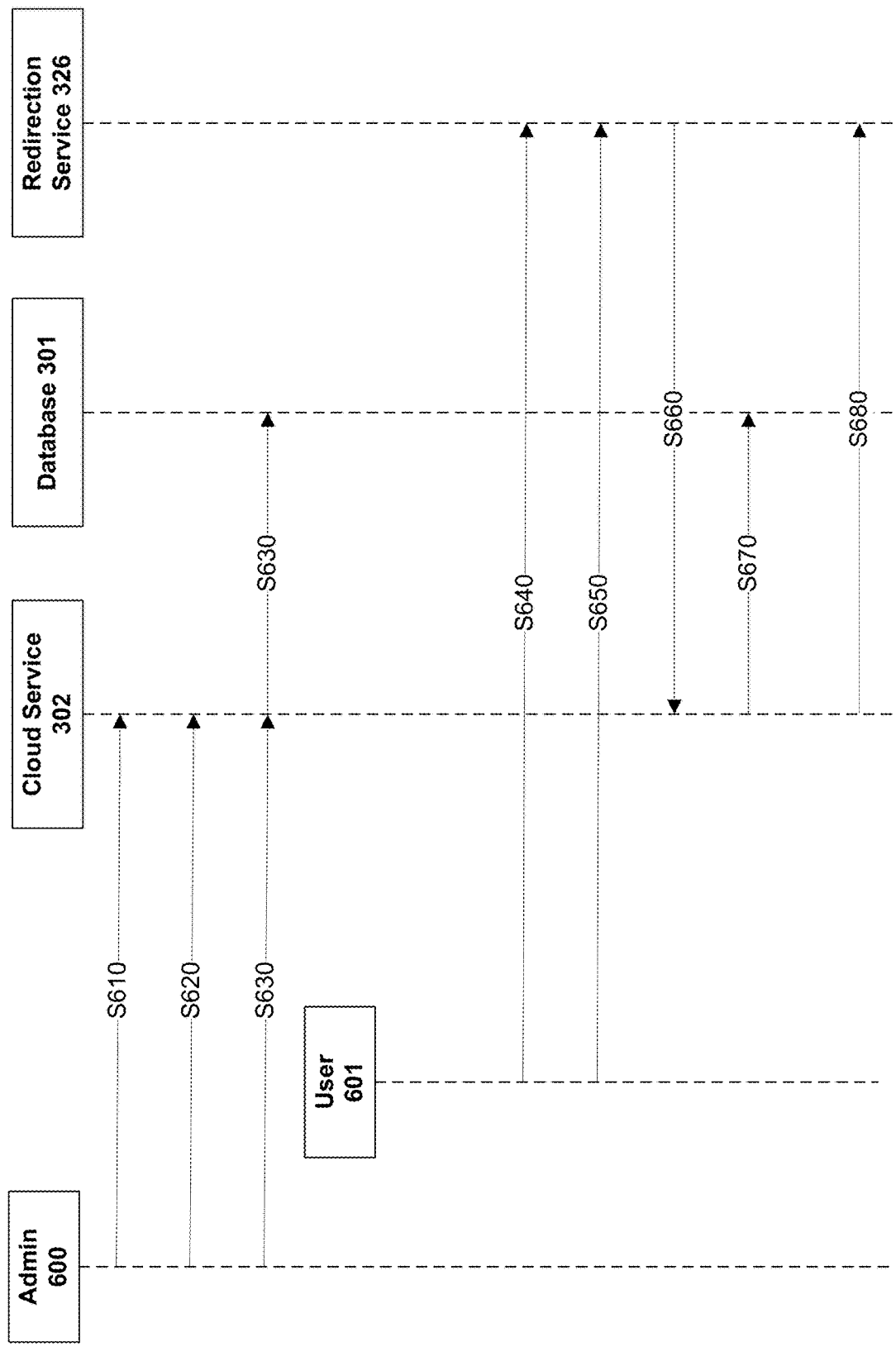
FIG. 6 illustrates a message flow diagram for registering users and user endpoint devices and workspaces with a centralized notification system.

FIG. 6 illustrates a message flow diagram for an algorithm for registering endpoint devices and workspaces with the central notification service 302. In step S610, an administrator 600 may login to the central notification service 302 via an administrative credential. The administrator 600 login may be limited to a subset of associated work groups to whom the administrator is assigned. In step S620, the administrator 600 may initiate a one time registration for each of the workspaces and endpoint devices to be associated with an end user 601. In step S630, based on selections, settings and configurations by the administrator 600, the central notification service 302 may add new data to or update data stored in the notification database 301. This data may include account information, associated groups, associated authorizations, and whitelists and blacklists to be associated with a user account.

In step S640, the end user 601 may launch the central notification service 302 via an end user credential. In step S650, when the end user 601 launches the central notification service 302, an application whitelist may be added or update, including an update for a notification redirection service 326 on devices and workspaces associated the end user 601. The end user 601 may configure a local application whitelist by selecting notification settings for the notification redirection service 326.

In step S660, the notification redirection service 326 may register or authenticate the end user device with the central notification service 302 based on an endpoint device identifier and the end users authentication credentials. In step S670, the central notification service 302 may use the endpoint device identifier and the end user authentication credentials to authenticate the user and the associated device. The central notification service 302 may compare the endpoint device identifier and the end user authentication credentials with user account data stored in the notification database 301, and may retrieve a global application whitelist associated with the user account. In step S680, the central notification service 302 may return an account login validation information and may transmit the global application whitelist associated with the user account.

The local application whitelist settings may be locally stored or may be transferrable to the central notification service 302 for storage in database 301. The local application whitelist may be combined with a global application whitelist received from the central notification service 302, and the notification redirection service 326 may be configured to allow the end user 601 to enable notifications from any applications on the combined global and local whitelists to be transmitted to the central notification service 302.

Figure 7:
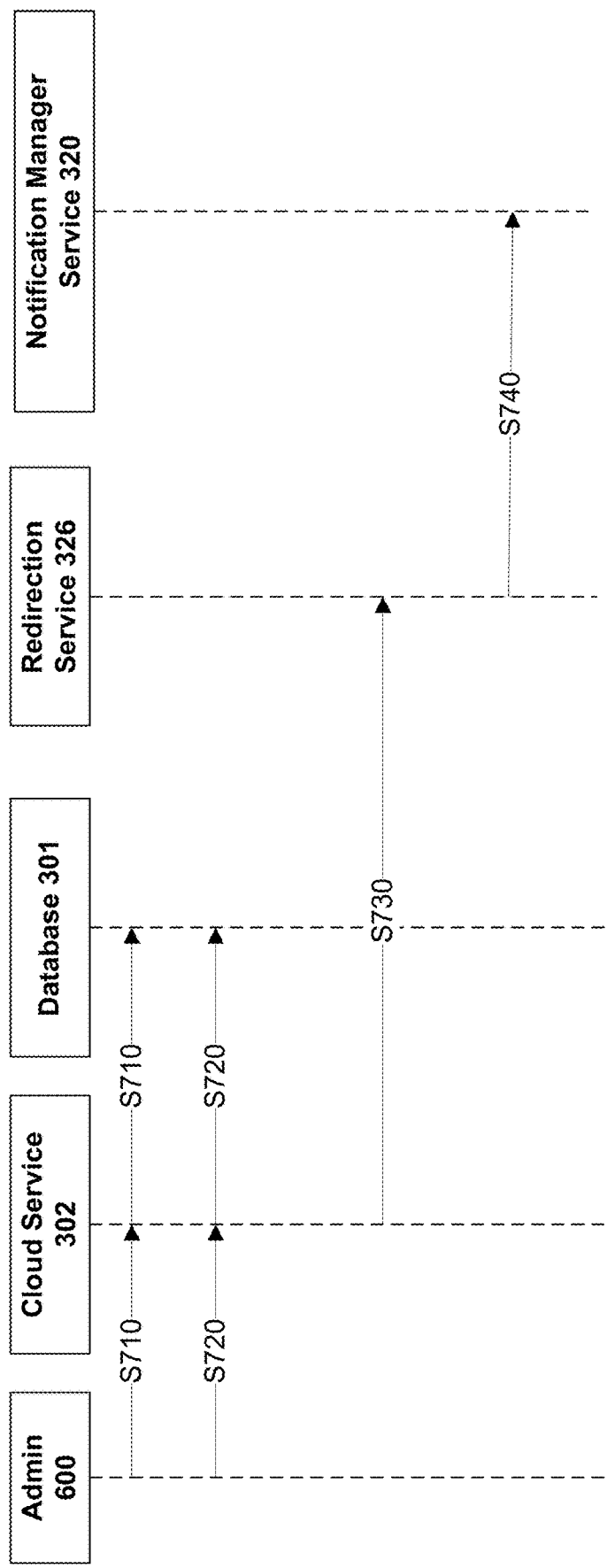
FIG. 7 illustrates a message flow diagram for updating and propagating an application whitelist.

FIG. 7 illustrates a message flow diagram for an algorithm for creating, updating, and propagating an application whitelist. In step S710, an administrator 600 may log into the central notification service 302 and create or access a user account. The administrator login may be part of a single authentication login event that allows the administrator to access a plurality of cloud services, including requesting access to data in the database 301 such as a global whitelist. In step S720, the administrator 600 may access the central notification service 302 and create or update application whitelist data. The application whitelist may be a global whitelist that indicates all applications supported and approved by the administrator, and may be a global application whitelist for at least one group or organization associated with at least one user account. A global whitelist may be supplemented with local whitelist data that includes user specific data generated based on settings or configurations by an end user at each device and/or workspace.

In step S730, the central notification service 302 may transmit the application whitelist to at least one notification redirection service 326 installed on an end user device.

When administrator 600 makes additions or updates to a whitelist stored in the database 301, the administrator 600 may push the updates to associated redirection services 326. The whitelist stored in the database 301 may also be requested by redirection services 326 upon a device being powered on or a upon a client registration event, from an end user device 332 or an end user workspace 314. In step S740, the notification redirection service 326 may combine a global application whitelist and a local application whitelist, and may distribute hooks to any associated notification manager services 320 or applications 322.

Figure 8:
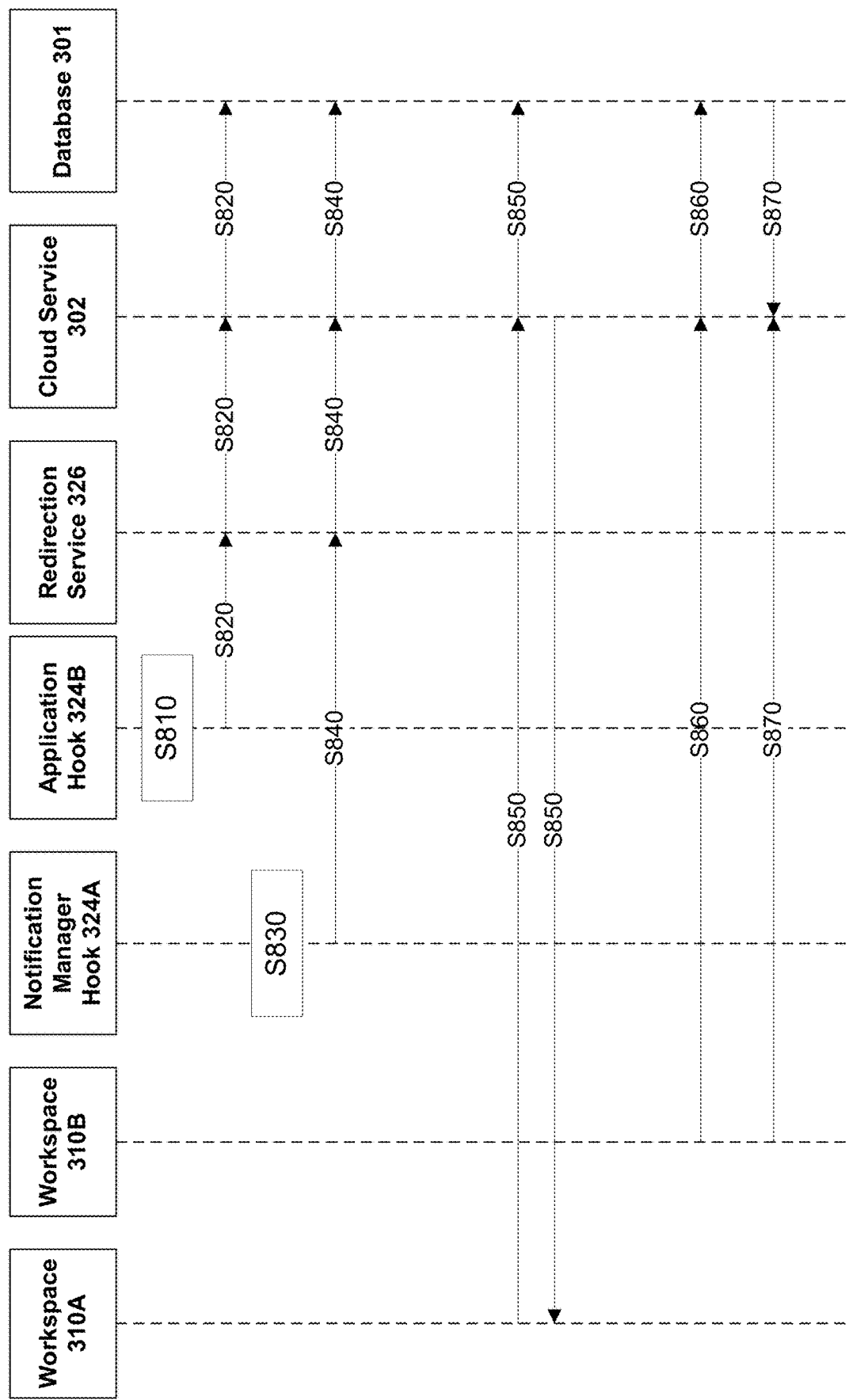
FIG. 8 illustrates a message flow diagram for processing notification events from different sources for storage in a notification database.

FIG. 8 illustrates a message flow diagram for an algorithm for processing notification events from different sources, such as workspaces or endpoint devices, for storage in the notification database 301. In step S810, a notification event may be generated in or received by the notification manager service 320 and detected by the application hook 324B. In step S820, the notification event may be transmitted by the hook to the notification redirection service 326, the notification redirection service 326 may transmit the notification event to the central notification service 302, and the central notification service 302 may store the notification event in the notification database 301. The notification event may be transmitted in a predefined message format generated by the notification redirection service 326, including a message header, such that the central notification service 302 may recognize the source and content of the notification. In step S830, a notification event may be generated in or received by the notification manager service 320 and detected by the notification manager service hook 324A. In step S840, the notification event may be transmit the notification event to the notification redirection service 326, the notification redirection service 326 may transmit the notification event to the central notification service 302, and the central notification service 302 may store the notification event in the notification database 301.

In step S850, a notification event may be generated in or received by the workspace 310A, which may be determined by the notification feed 314, the notification event may be transmitted to the central notification service 302, and the central notification service 302 may store the notification event in the notification database 301. The central notification service 302 may confirm receipt of any received notification events and may transmit any updated notification data to the workspace 310A.

In step S860, a second active workspace 310B may complete a login and authentication with the central notification service 302, and may transmit any new notification events associated with the workspace to a notification feed 314 of the central notification service 302, which may store the notification event in the notification database 301.

Based on a workspace login, the central notification service 302 may initiate a notification sync, in step S870. The central notification service 302 may retrieve new notification event messages from the notification database 301, and may transmit the notification events to a notification feed 314 of the workspace 310B. The new notification events may be generated from a plurality of end user devices and workspaces, such as the processes described above with regards to steps S810-S850. A syncing process, including transmitting new notification events to the central notification service 302 for storage in the database 301 of S860 and the retrieval of notification events in S870 may continue periodically for the duration of the user authenticated session.

Figure 9:
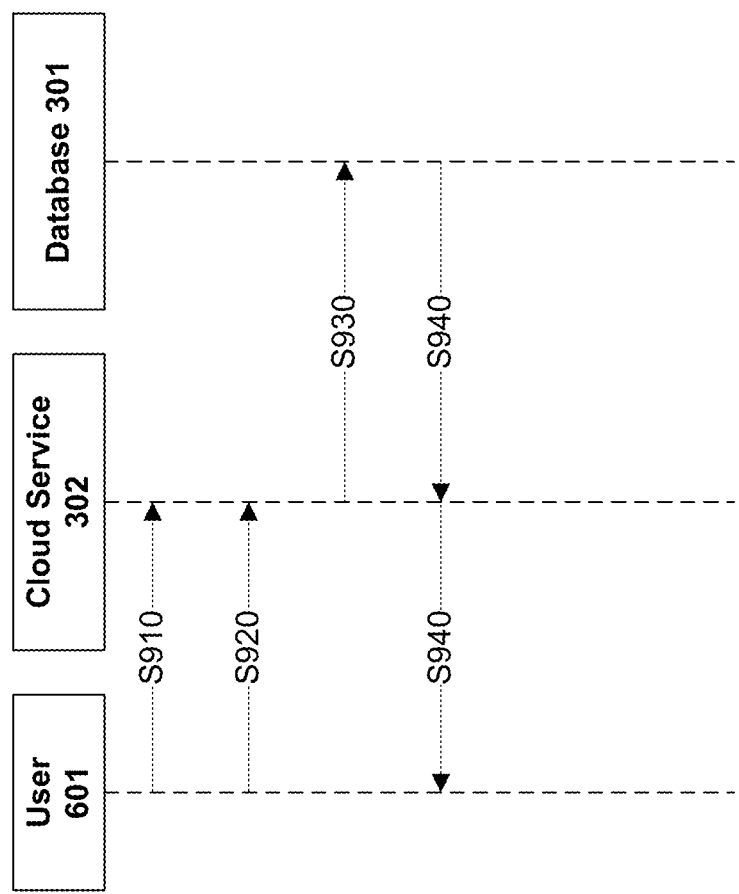
FIG. 9 illustrates a message flow diagram for processing remote notification events access requests from workspaces or endpoint devices which are not associated with an end user.

FIG. 9 illustrates a message flow diagram for an algorithm for processing remote notification events access requests from different devices, such as different workspaces or endpoint devices which may not have been previously associated with an end user. For example, the end user may initiate a remote access request from an unregistered computer when travelling or working from a client office. In step S910, an end user 601 may initiate a login event to a remote access API for the central notification service 302. The login event may be associated with a remote workspace application that provides secure access to a plurality of cloud or network based applications or resources. The remote workspace application may not include a dedicated notification feed. In step S920, an end user 601 may request notification data from the central notification service 302. This request for notification data may include a request for access to a notification feed 314 application from a cloud service, including a SaaS notification feed. The request for access to the notification feed may comprise user authentication data associated with the session, which may be used by the central notification service 302 to identify the end user and determine the appropriate notification data.

In step S930, the central notification service 302 may request end user 601 account information, including authorization to provide notifications to an unregistered device. The central notification service 302 may also transmit requests to devices associated with user account to transmit notification updates to the central notification service 302. In step S940, the central notification service 302 may retrieve notification messages from the notification database 301, may store any newly received notification data to the notification database 301, and may transmit the notification messages to a remote access API of the end user 601. When using the remote access API, is may not be necessary to any whitelist to the user requesting the notification feed data, or to transmit any notification requests from the remote API. The end user may select messages to be retrieved or may request particular sets of messages.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing system and from a notification redirection service on a first remote device, at least one notification associated with a user, wherein the at least one notification is associated with a first application, and wherein the first remote device has a first application whitelist that includes the first application;
   storing, by the computing system and in a notification database, the at least one notification associated with the user and from the first remote device, wherein the at least one notification is stored in a portion of the notification database associated with the user;
   determining, by the computing system, an authenticated user workspace of a second remote device associated with the user;
   identifying a second application whitelist for the second remote device;
   checking the first application against the second application whitelist for the second remote device, wherein the checking results in an identification that the first application is not included in the second application whitelist; and based on identifying that the first application is not included in the second application whitelist for the second remote device, disposing of the at least one notification rather than transmitting, by the computing system and to the authenticated user workspace of the second remote device, the at least one notification associated with the user and from the first remote device.

2. The method of claim 1, further comprising:
transmitting, by the computing system and to the first remote device, the notification redirection service configured to obtain notification data from at least one application; and
causing, by the computing system and in the first remote device, installation of the notification redirection service.

3. The method of claim 2, further comprising:
receiving, by the computing system and from the first remote device, an indication of a user login event;
transmitting, by the computing system and to the notification redirection service on the first remote device, the first application whitelist associated with the first remote device; and
causing, by the computing system, transmission of at least one notification from the notification redirection service of the first remote device based on the first application whitelist.

4. The method of claim 1, further comprising:
transmitting, by the computing system and to the first remote device, the first application whitelist associated with the user;
causing, by the computing system and in the first remote device, installation of a notification hook in at least one application indicated by the first application whitelist; and
receiving, by the computing system, at least one notification generated by the at least one application.

5. The method of claim 1, further comprising:
receiving, by the computing system and from a workspace associated with the user, an indication of a user login event;
transmitting, by the computing system and to the workspace, the first application whitelist associated with the first remote device; and
causing, by the computing system, transmission of at least one notification from the first remote device based on the first application whitelist.

6. The method of claim 1, further comprising:
receiving, by the computing system and from a workspace associated with the user, credential information for a user login event;
matching, by the computing system and to the workspace, the credential information with user account information stored in the notification database; and
transmitting, by the computing system and to the workspace associated with the user, at least one notification stored in the notification database and associated with user account information matching the credential information.

7. The method of claim 6, wherein the credential information for the user login event is used to authenticate the user to a plurality of cloud computing services.

8. The method of claim 1, further comprising:
determining, by the computing system, a plurality of devices and workspaces associated the user;
requesting, by the computing system and from each of the plurality of devices and workspaces associated the user, notification data;
storing, by the computing system and in the notification database, notification data received in response to the requesting; and
transmitting, by the computing system and to the authenticated user workspace, the stored notification data.

9. The method of claim 1, wherein the at least one notification associated with the user, is transmitted by the computing system to a notification feed application of the second remote device.

10. The method of claim 1, further comprising:
receiving, by the computing system and from the authenticated user workspace, notification data generated by the authenticated user workspace.

11. A computing system comprising:
a processor;
memory storing computer executable instructions that, when executed by the processor, cause the computing system to:
receive, from a first remote device, a notification associated with at least one user account, wherein the notification is associated with a first application and wherein the first remote device has a first application whitelist that includes the first application;
store, in a notification database, the notification, wherein the notification is associated with the at least one user account and is stored in a portion of the notification database associated with the at least one user account;
determine an authenticated user workspace of a second remote device associated with the at least one user account;
identify a second application whitelist for the second remote device;
check the first application against the second application whitelist for the second remote device, wherein the checking results in an identification that the first application is not included in the second application whitelist;
and
based on identifying that the first application is not included in the second application whitelist for the second remote device, dispose of the notification rather than transmitting, to an authenticated user workspace session, the notification associated with the at least one user account and from the first remote device.

12. The computing system of claim 11, wherein the instructions, when executed by the processor, further cause the computing system to:
periodically request notification data from a plurality of devices and workspaces associated the at least one user account; and
transmit, based on the authenticated user workspace, the notification data stored in the notification database.

13. The computing system of claim 11, wherein the instructions, when executed by the processor, further cause the computing system to:
receive an indication of a user login event for the at least one user account;
request, based on the indication of the user login event for the at least one user account, notification data from at least one remote device associated with the at least one user account;
store the notification data in the notification database; and transmit the notification data to the authenticated user workspace session.

14. The computing system of claim 13, wherein the instructions, when executed by the processor, further cause the computing system to:
   receive an indication of a user login event from a workspace associated with the at least one user account;
   transmit, to the authenticated user workspace session, the second application whitelist associated with the second remote device; and
   request transmission of at least one notification from the second remote device.

15. The computing system of claim 11, wherein the instructions, when executed by the processor, further cause the computing system to:
   receive, from the authenticated user workspace session, credential information for a user login event;
   match the credential information with user account information stored in the notification database; and
   transmit, to an authenticated user workspace session associated with the at least one user account, at least one notification stored in the notification database and associated with the authenticated user workspace session by matching the credential information.

16. The computing system of claim 11, wherein the instructions, when executed by the processor, further cause the computing system to:
   determine a plurality of devices and workspaces associated the at least one user account;
   request notification data from each of the plurality of devices and workspaces associated the at least one user account;
   store notification data received in response to the request in the notification database; and
   transmit the stored notification data to an authenticated user workspace session.

17. One or more non-transitory computer-readable media storing instructions that, when executed by a computing system comprising at least one processor, a communication interface, and memory, cause the computing system to:
   receive, by the computing system and from a notification redirection service on a first remote device, at least one notification associated with a user, wherein the at least one notification is associated with a first application, and wherein the first remote device has a first application whitelist that includes the first application;
   store, by the computing system and in a notification database, the at least one notification associated with the user and from the first remote device, wherein the at least one notification is stored in a portion of the notification database associated with the user;
   determine, by the computing system, an authenticated user workspace of a second remote device associated with the user;
   identify a second application whitelist for the second remote device;
   check the first application against the second application whitelist for the second remote device, wherein the checking results in an identification that the first application is not included in the second application whitelist; and
   based on identifying that the first application is not included in the second application whitelist for the second remote device, dispose of the at least one notification rather than transmitting, by the computing system and to the authenticated user workspace of the second remote device, the at least one notification associated with the user and from the first remote device.

18. The one or more non-transitory computer-readable media of claim 17, wherein the at least one processor is further configured to:
   transmit, by the computing system and to the first remote device, the notification redirection service configured to obtain notification data from at least one application; and
   cause, by the computing system and in the first remote device, installation of the notification redirection service.

19. The one or more non-transitory computer-readable media of claim 18, wherein the at least one processor is further configured to:
   receive, by the computing system and from the first remote device, an indication of a user login event;
   transmit, by the computing system and to the notification redirection service on the first remote device, an application whitelist associated with the first remote device; and
   cause, by the computing system, transmission of at least one notification from the notification redirection service of the first remote device based on the application whitelist.

20. The one or more non-transitory computer-readable media of claim 17, wherein the at least one processor is further configured to:
   transmit, by the computing system and to the first remote device, an application whitelist associated with the user;
   cause, by the computing system and in the first remote device, installation of a notification hook in at least one application indicated by the application whitelist; and
   receive, by the computing system, at least one notification generated by the at least one application.

* * * * *